US008511745B2

(12) United States Patent
Baldwin

(10) Patent No.: US 8,511,745 B2
(45) Date of Patent: Aug. 20, 2013

(54) INTEGRATED ENERGY ABSORBING VEHICLE CRASH STRUCTURE

(75) Inventor: Michael John Baldwin, Sunnyvale, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 96 days.

(21) Appl. No.: 13/241,675

(22) Filed: Sep. 23, 2011

(65) Prior Publication Data

US 2013/0076051 A1 Mar. 28, 2013

Related U.S. Application Data

(63) Continuation-in-part of application No. 13/240,780, filed on Sep. 22, 2011, now Pat. No. 8,353,545.

(51) Int. Cl.
*B62D 25/08* (2006.01)
*B60R 19/34* (2006.01)

(52) U.S. Cl.
USPC ....... 296/203.02; 293/133; 188/374; 188/377

(58) Field of Classification Search
USPC ............... 296/203.01, 203.02; 293/133, 155; 188/374, 377
See application file for complete search history.

(56) References Cited

U.S. PATENT DOCUMENTS

| | | | |
|---|---|---|---|
| 4,152,012 A | 5/1979 | Reidelbach et al. | |
| 5,181,589 A | 1/1993 | Siegner et al. | |
| 6,893,065 B2 * | 5/2005 | Seksaria et al. | 293/133 |
| 7,192,067 B2 * | 3/2007 | Hansen | 293/133 |
| 7,617,916 B2 | 11/2009 | Heatherington et al. | |
| 7,717,465 B2 | 5/2010 | Hedderly | |
| 7,976,082 B2 * | 7/2011 | Song | 293/133 |
| 2002/0162224 A1 * | 11/2002 | Gabbianelli et al. | 29/897.2 |
| 2007/0261592 A1 * | 11/2007 | Mochida et al. | 105/392.5 |
| 2012/0074721 A1 | 3/2012 | LaTurner et al. | |

* cited by examiner

*Primary Examiner* — Dennis Pedder
(74) *Attorney, Agent, or Firm* — Patent Law Office of David G. Beck

(57) ABSTRACT

A crash structure is provided that is integrated within a vehicle side rail, the crash structure providing relatively level loading during a collision. The structure includes an actuator member coupled to the bumper, the actuator member passing into, and slidably disposed within, a hollow housing of the crash structure. The hollow housing contains a plurality of deformable members that at least partially surround a first portion of the actuator member. A second portion of the actuator member, which is between the bumper and the first portion of the actuator member, has a larger diameter than that of the first portion of the actuator member and is configured to deform the deformable members during a collision.

12 Claims, 9 Drawing Sheets

INTEGRATED ENERGY ABSORBING VEHICLE CRASH STRUCTURE

CROSS-REFERENCE TO RELATED APPLICATION

The present application is a continuation-in-part of U.S. patent application Ser. No. 13/240,780, filed Sep. 22, 2011, the disclosure of which is incorporated herein by reference for any and all purposes.

FIELD OF THE INVENTION

The present invention relates generally to vehicle crash structures and, more particularly, to a crash structure integrated into a vehicle side rail that uses a combination of friction and deformation to achieve a crash structure that yields relatively constant loading during a collision.

BACKGROUND OF THE INVENTION

Modern vehicles use a variety of structures to protect the vehicle's occupants during a crash. Some of these structures are used to control the transmission of the crash energy to the passenger compartment while other structures, such as seat belts, head restraints, and air bags, are intended to restrain passenger movement during a crash, thereby preventing the passengers from hurting themselves as their bodies react to the crash forces. In addition to reducing the potential for personal injuries, many vehicle crash structures are also designed to minimize vehicle damage and simplify post-crash repairs.

A variety of different approaches and structures have been used to absorb and control the transmission of crash energy into the vehicle. As the bumper is typically the first vehicle structure to be impacted during a crash, many crash structures attempt to absorb as much energy as possible in the bumper itself, thus minimizing the energy that is transmitted into the vehicle. For example, U.S. Pat. No. 4,018,466 discloses a bumper assembly in which the bumper is comprised of a hollow beam that houses a plurality of shock absorbing cellular blocks. The shock absorbing cellular blocks are inserted into pocket-like sections of the bumper. In an alternate shock-absorbing bumper, disclosed in U.S. Pat. No. 6,000,738, the bumper includes an outer wall disposed to receive the crash force, an inner wall that is coupled to the vehicle structure and four walls that connect the inner and outer bumper walls. During a car crash, the four connecting walls are designed to bend at a controlled rate, thereby absorbing crash energy.

While crash energy may be absorbed in the bumper, large impact crashes typically require the use of other energy absorbing structures. For example, in a conventional vehicle the bumpers are often coupled to the vehicle by one or more crash boxes that are designed to collapse during a crash, thereby absorbing crash energy. U.S. Pat. No. 7,290,811 discloses one design for a crash box in which two overlapping and interconnected sheet metal shells form the crash box. The crash box is bolted to the bumper cross-member using at least one bolt that extends in a vertical direction through the overlap zone of the structure. U.S. Pat. No. 7,533,913 discloses an alternate crash box design using inner and outer curved members which extend in the longitudinal direction of the vehicle. The inner member includes a plurality of bead-shaped protrusions that are intended to cause longitudinal compressing deformation of this member in a low-speed collision, thereby helping to direct the striking energy created by the collision away from the inside of the vehicle.

While a variety of energy absorbing structures have been designed that are intended to increase the safety of a vehicle's occupants during a collision, in general these systems require various structural components to bend and fold in order to absorb the crash energy, thus requiring a relatively large volume of space to accommodate the collapsing structure. A conventional crash system further exacerbates this inefficient use of vehicle volume since such structures typically rely on two different mechanisms to absorb crash energy, depending upon whether the collision is a low-speed collision or a high-speed collision. Additionally, as such crash structures collapse in a series of steps due to the folding nature of the structure, the energy loading transmitted and applied to the primary vehicle structure, including the passenger compartment, is comprised of a series of peaks and troughs. Accordingly, what is needed is a crash structure that achieves relatively level loading during a crash, requires minimal space, and simplifies post-collision vehicle repairs. The present invention provides such a structure.

SUMMARY OF THE INVENTION

The present invention provides a crash structure that is integrated within a vehicle side rail, the crash structure providing relatively level loading during a collision.

In an exemplary embodiment, the crash structure is integrated within a vehicle side rail and comprised of a hollow housing; an actuator member that is coupled to the vehicle's bumper and that passes into, and is slidably disposed within, the hollow housing; and a plurality of deformable members contained within the hollow housing that at least partially surround a first portion of the actuator member. A second portion of the actuator member, which is between the bumper and the first portion of the actuator member, has a larger diameter than that of the first portion. The hollow housing and the plurality of deformable members contained therein may be formed using an extrusion process and may be fabricated, for example, from aluminum or an aluminum alloy. Each of the deformable members may be comprised of a hollow structure with at least one wall of the deformable member being common with at least one wall of the hollow housing. The actuator member may be comprised of a cylindrical tube fabricated, for example, of aluminum, an aluminum alloy or steel. The vehicle side rail may be comprised of a pair of hexagon-shaped channels that share a common wall and the hollow housing may be hexagon-shaped and configured to be inserted within one of the hexagon-shaped channels comprising the vehicle side rail. The vehicle side rail may be comprised of a pair of octagon-shaped channels that share a common wall and the hollow housing may be octagon-shaped and configured to be inserted within one of the octagon-shaped channels comprising the vehicle side rail. The hollow housing may comprise a mounting flange that is used to couple to a vehicle side rail mounting flange. A retention member, for example coupled to a hollow housing mounting flange, may be used to prevent the actuator member from being withdrawn from the housing.

A further understanding of the nature and advantages of the present invention may be realized by reference to the remaining portions of the specification and the drawings.

DESCRIPTION OF THE SPECIFIC EMBODIMENTS

Figure 1:
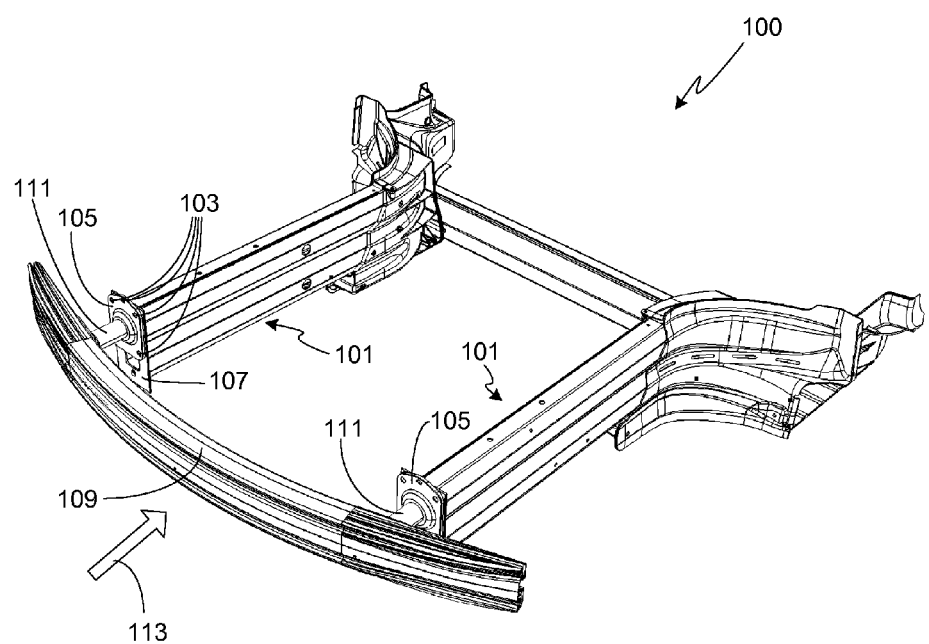
FIG. 1 provides a perspective view of a front vehicle structure in accordance with the invention.

FIG. 1 is a perspective view of a front vehicle structure 100 in accordance with the invention. Structure 100 includes a pair of energy absorbing structures, also referred to herein as crash structures, each of which is integrated into a vehicle side rail 101. As described in detail below, the crash structures are preferably inserted into the end of the side rails 101 and held in place by coupling an end flange 105 of each crash structure to a complementary flange 107 of each side rail using a plurality of bolts 103 or other means. One benefit of using mounting flanges or similar means to hold the crash structures in place is that in the case of a minor collision it is often possible to simply remove and replace the crash structure assemblies, along with the bumper, without having to repair the primary vehicle structure (e.g., side rails). It should be understood that if desired, other means may be used to hold the crash structures in place within the side rails, for example using an interference fit between the two.

Figure 12:
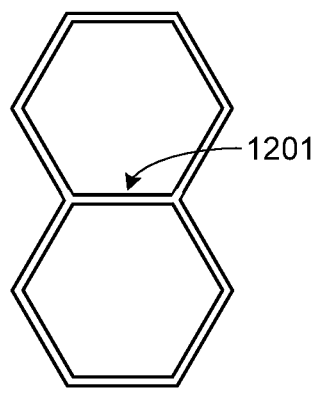
FIG. 12 provides a cross-sectional view of a vehicle side rail utilizing a pair of octagon-shaped structures for the upper and lower channels, the two channels sharing a common wall.
Figure 13:
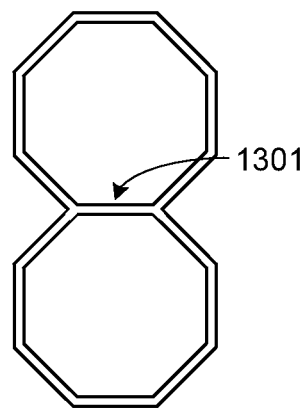
FIG. 13 provides a cross-sectional view of a vehicle side rail utilizing a pair of hexagon-shaped structures for the upper and lower channels, the two channels sharing a common wall.

In the preferred embodiment and as illustrated in the accompanying figures, the vehicle side rails 101, which extend in a longitudinal direction and are located on opposite traverse sides of the vehicle as shown, are comprised of a pair of multi-walled channels that share a common wall (e.g., common wall 1201 in FIG. 12 and common wall 1301 in FIG. 13). In at least some embodiments, and as shown, each channel is a hexagon-shaped structure (see, for example, FIG. 12). In at least some other embodiments, each channel is an octagon-shaped structure (see, for example, FIG. 13). The multi-walled channel shape provides strength and rigidity in a relatively low-weight structure. As shown in the figures below, preferably the outer surface of the crash structure assemblies utilize the same shape, thus allowing the crash structures to be simply inserted into the side rails. Vehicle side rails 101 are preferably fabricated from aluminum or an aluminum alloy using an extrusion process, although other materials and fabrication processes may be used.

Bumper 109 is coupled to each crash structure by an elongated member 111, also referred to herein as actuating members or tubes. Members 111 may be fabricated from steel, aluminum, an aluminum alloy, or other material. Preferably members 111 are comprised of tubes, thus allowing the weight of the members to be minimized while still providing the necessary strength and rigidity. In the preferred embodiment, members 111 are comprised of cylindrical tubes, thus simplifying both manufacturing cost and assembly complexity.

Figure 2:
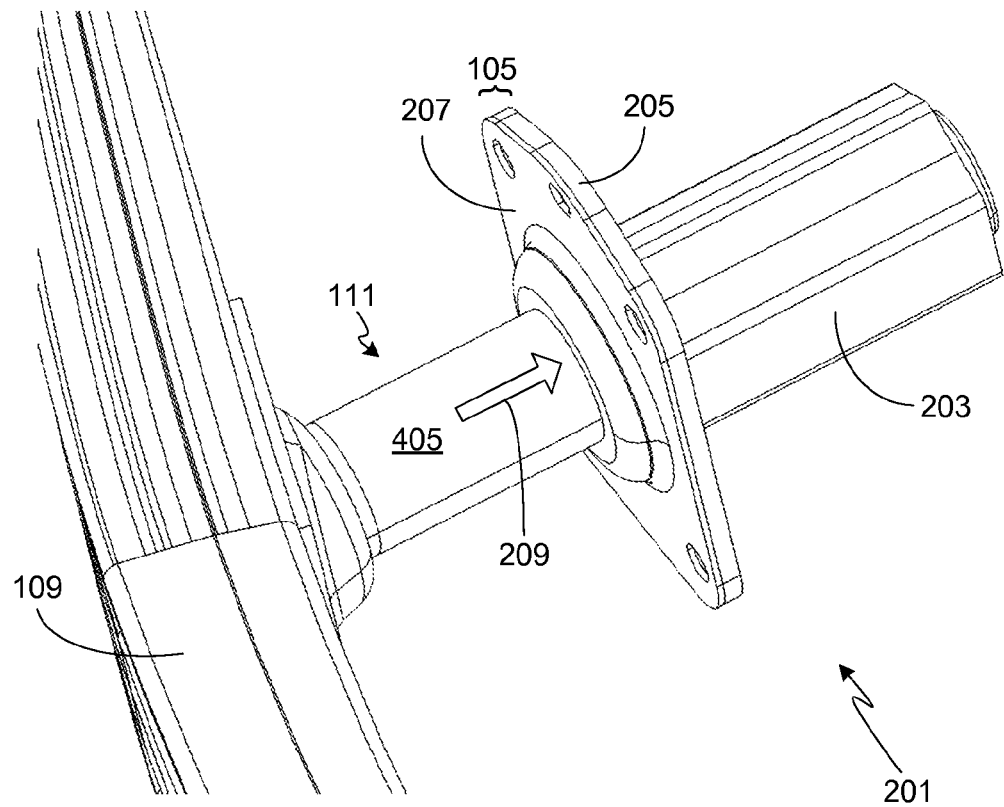
FIG. 2 provides a perspective view of the crash structure removed from the vehicle side rail.
Figure 3:
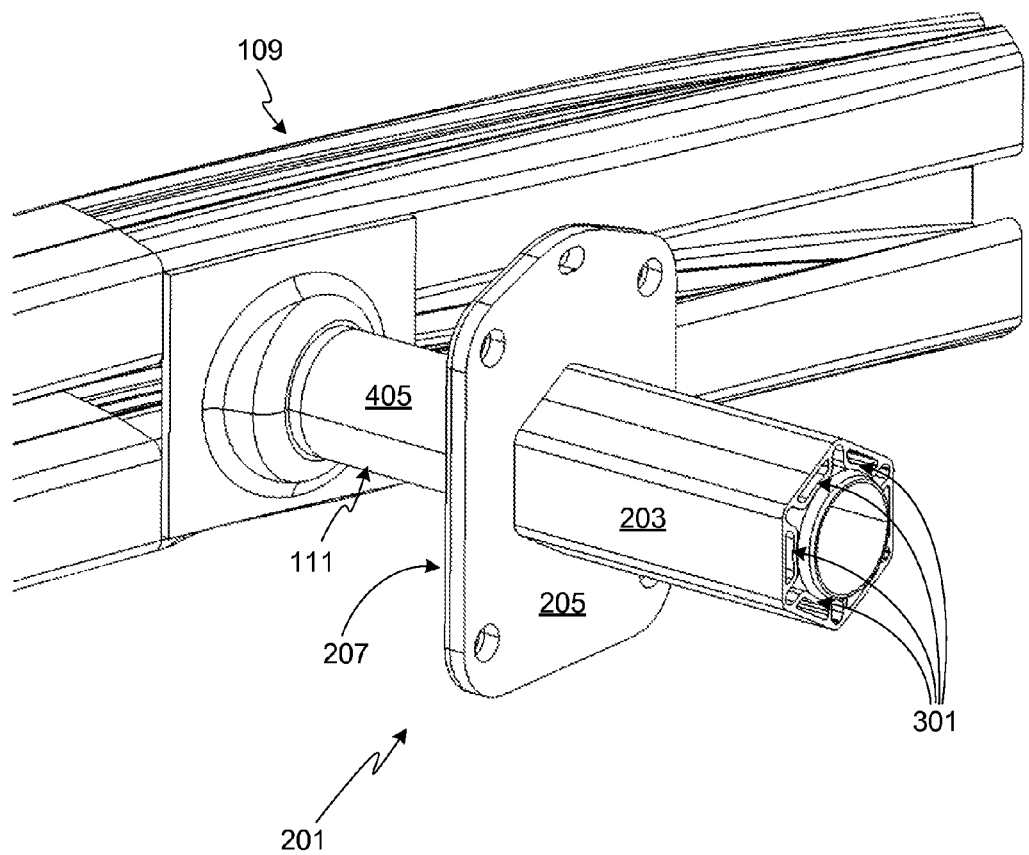
FIG. 3 provides an alternate perspective view of the crash structure shown in FIG. 2.
Figure 4:
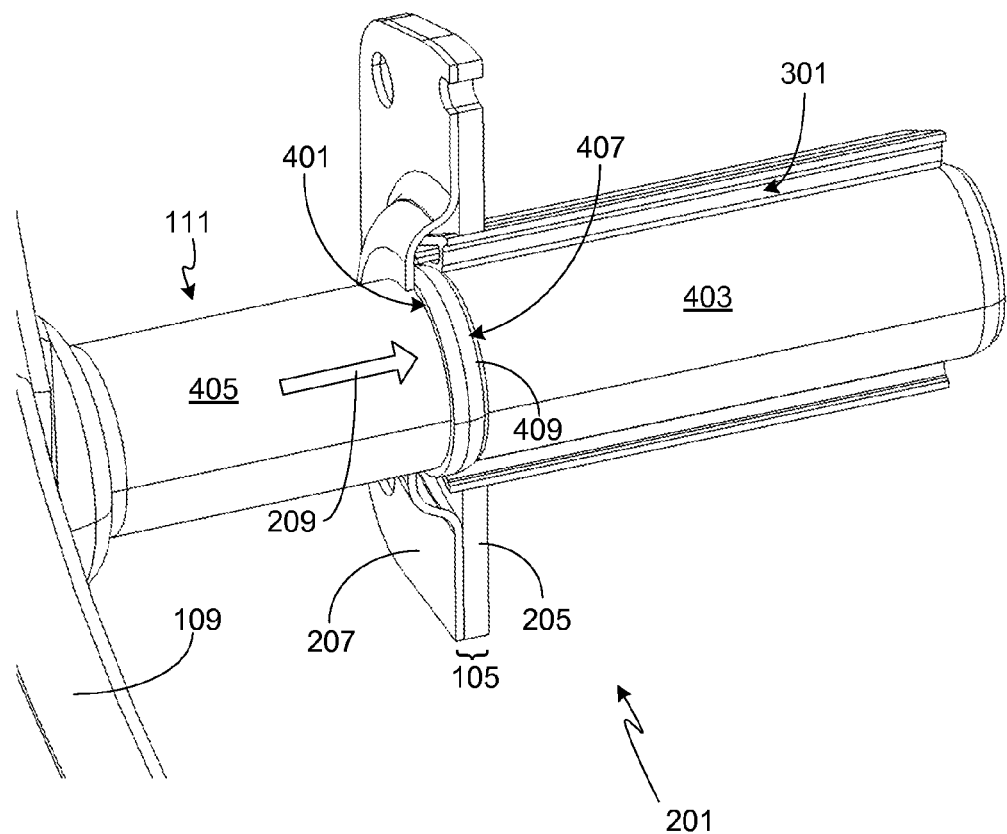
FIG. 4 provides a similar perspective view of the crash structure shown in FIG. 2 with a portion of the crash structure shown in cross-section.
Figure 5:
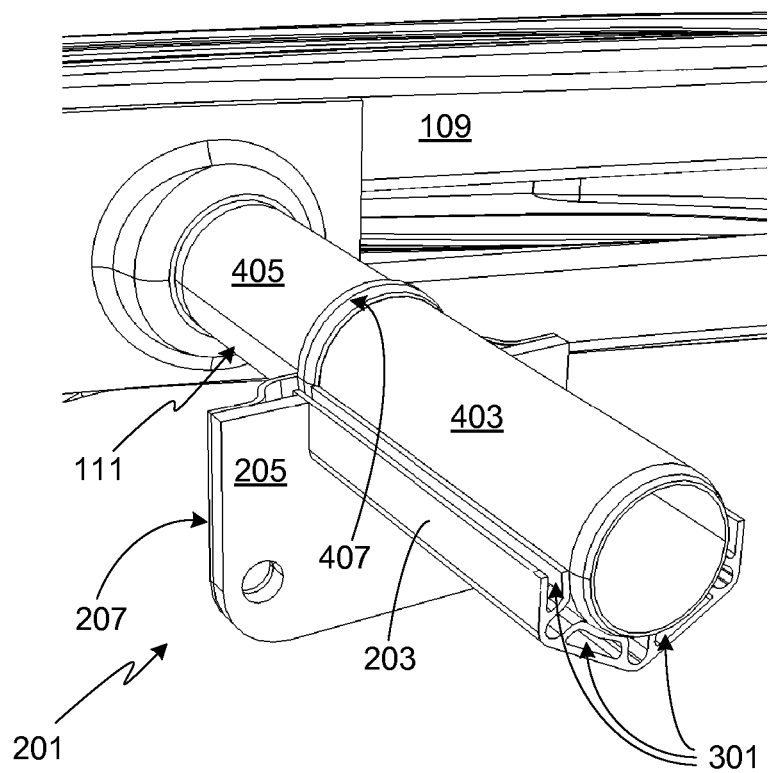
FIG. 5 provides a similar perspective view of the crash structure shown in FIG. 3 with a portion of the crash structure shown in cross-section.

FIGS. 2 and 3 provide perspective views of a crash structure 201 removed from the vehicle side rail. FIGS. 4 and 5 provide corresponding perspective views with portions of the structure shown in cross-section. Actuator members 111 are slidably disposed within housing 203 of the crash structure 201. As shown, in the preferred embodiment crash structure flange 105 is comprised of two members; a structure mounting flange 205 and a retaining member 207. Retention plate 207, also referred to herein as a retention or retaining member, captures member 111 within the corresponding housing 203, thereby preventing the bumper assembly from being unintentionally dislodged, or partially withdrawn, from the crash structure integrated into the side rail. In the preferred and illustrated embodiment, actuator 111 includes a lip 401 that is captured by retaining member 207 as shown. It should be understood that this is simply one means of capturing the actuator member and that other means may be used to achieve the same result.

Actuator member 111 is comprised of three sections; a leading section 403 that is closest to the vehicle's passenger compartment, a rear section 405 that is closest to the vehicle's bumper, and a transition region 407. The outer diameter of the leading and rear sections of the actuator member may be the same or different. Transition region 407 has an outer diameter larger than that of leading section 403. Preferably the leading surface 409 of transition region 407 is sloped, for example using a 45 degree chamfer.

Housing 203 is designed to fit within one of the multi-walled channels comprising vehicle side rail 101, for example the upper hexagon-shaped channel shown in FIG. 1. Preferably housing 203 is retained within the vehicle side rail using a combination of an interference fit and flanges 105 and 107. Integrated within housing 203 are a plurality of deformable members 301. In the preferred embodiment, and as further shown in the cross-sectional view of FIG. 6, the crash structure includes six deformable members 301; one deformable member corresponding to each housing wall. It will be appreciated, however, that the crash structure does not need to include the same number of deformable members as the number of longitudinal housing walls. For example, FIG. 7 illustrates an alternate configuration in which there are fewer deformable members 701 than housing walls. Regardless of the number of deformable members, preferably the outer surface 601 of section 403 of actuator 111 is not only adjacent to, but also in contact with, the inner surface 603 of each deformable member 301.

Figure 6:
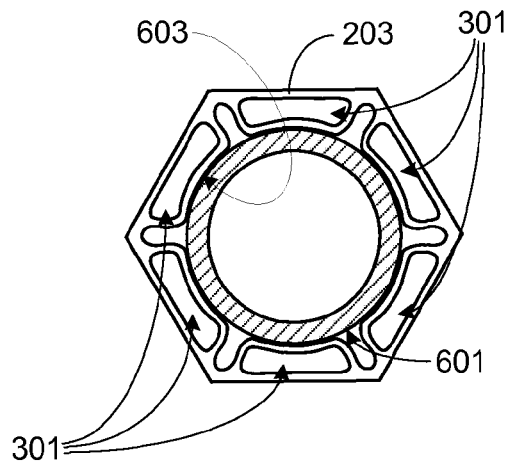
FIG. 6 provides a cross-sectional view of a portion of the crash structure illustrating the structure's deformable members.
Figure 7:
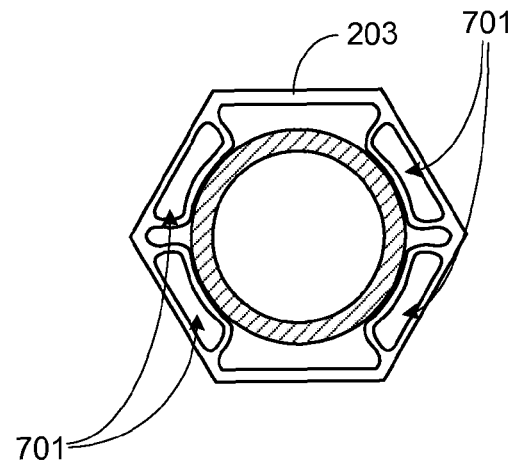
FIG. 7 provides a cross-sectional view of an alternate crash structure in which there are less deformable members than crash structure longitudinal walls.
Figure 8:
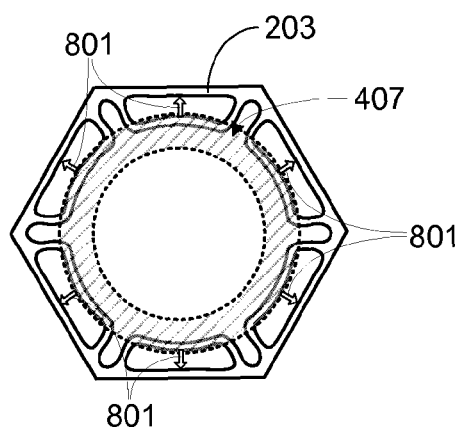
FIG. 8 illustrates the same cross-sectional view shown in FIG. 6, with the addition of the larger diameter portion of the actuator member projected onto the view.

FIG. 8 is identical to FIG. 6, except that it shows the larger diameter of transition region 407 of actuator 111 projected, in phantom, onto the deformable members 301. The relationship between deformable members 301 and tubular member 111 is also shown in FIGS. 4 and 5, these figures providing a longitudinal cross-sectional view of housing 203 prior to deformation of deformable members 301.

During a collision, bumper 109 is pushed in a direction 113 as shown in FIG. 1, causing actuator member 111 to be pushed in a direction 209 into housing 203 (FIGS. 2 and 4). As member 111 is forced in a direction 209, the leading edge 409 of region 407 deforms the deformable members 301 in a direction 801 (see FIG. 8). Thus the crash energy is absorbed by a combination of the energy required to deform members 301 and the friction between member 111 and the deformable members within housing 203. Note that as members 301 are preferably continuous throughout housing 203, the loading that results from the passage of section 407 of member 111 through housing 203 is continuous, rather than being comprised of a series of loading peaks and valleys. As a result, during a collision the passenger compartment is not subjected to a series of jolts as it is when a conventional crash box is used in which the structure deforms through a series of bends and folds.

As previously noted, while the process of deforming the deformable members 301 within the crash structure are the primary means for absorbing crash energy, energy is also absorbed due to the friction between section 403 of the actuator member 111 and the deformable members 301 prior to deformation, and the friction between the leading edge 409 of section 407 and the deformable members 401 during the deformation process. The amount of energy absorbed in this way depends on the coefficient of friction between the contact surfaces of the deformable members and the actuator member as well as the contact area and the fit between the two. Note that in addition to absorbing energy via friction, the inner surfaces 603 of members 301 that contact the outer surface 601 of actuator 111 also help to guide the actuator through housing 203 during a collision, thereby insuring that the crash structure operates as intended.

The present invention allows the crash structure to be tuned to meet the energy absorbing needs associated with a particular vehicle design, for example by altering the amount of force required to deform the deformable members. The primary means for tuning the crash structure include, but are not limited to:

Increasing the difference between the diameter of sections 403 and 407 of member 111, thereby changing the distance that the deformable members must be deformed as member 111 is pushed through the housing.

Changing the angle on surface 409 of transition region 407 of the actuator.

Figure 9:
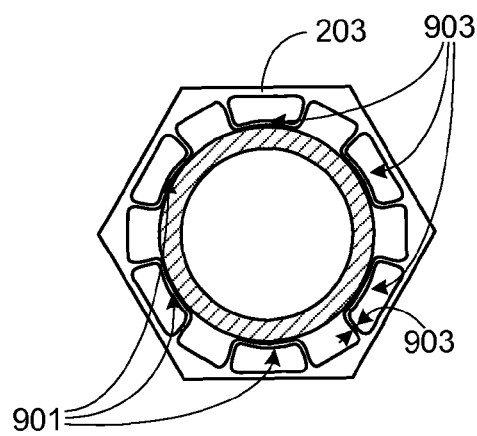
FIG. 9 provides a cross-sectional view of an alternate set of deformable members.
Figure 10:
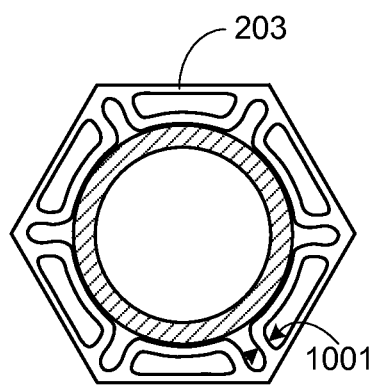
FIG. 10 provides a cross-sectional view of yet another alternate set of deformable members.

Altering the size, number or characteristics of the deformable members. For example and as previously noted, the system can be configured to use fewer deformable members as shown in FIG. 7. Alternately, and as illustrated in FIG. 9, the deformable members 901 can be made smaller with thinner walls 903, thus making these members more easily deformed. Alternately, the deformable members can be configured to be less deformable, for example by making them larger and, as illustrated in FIG. 10, utilizing a thicker wall 1001.

Changing material characteristics. For example, by changing the composition of housing 203 and internal deformable members 301 from aluminum to an aluminum alloy, or from aluminum to steel, or from one steel alloy to another, both the yield strength and the stiffness (i.e., its modulus of elasticity) of the deformable members may be varied in a controllable fashion.

Altering the friction between the actuator member 111 and the deformable members by varying the composition of the components and/or applying a coating to one or more contacting surfaces. For example, assuming that both member 111 and the deformable members are fabricated from aluminum, the sliding coefficient of friction between the two is 1.4 while the static coefficient of friction is 1.05-1.35. If one of the members, e.g., member 111, is fabricated from steel while the other members, e.g., the deformable members, are fabricated from aluminum, the sliding coefficient of friction between the two becomes 0.47 while the static coefficient of friction becomes 0.61.

Figure 11:
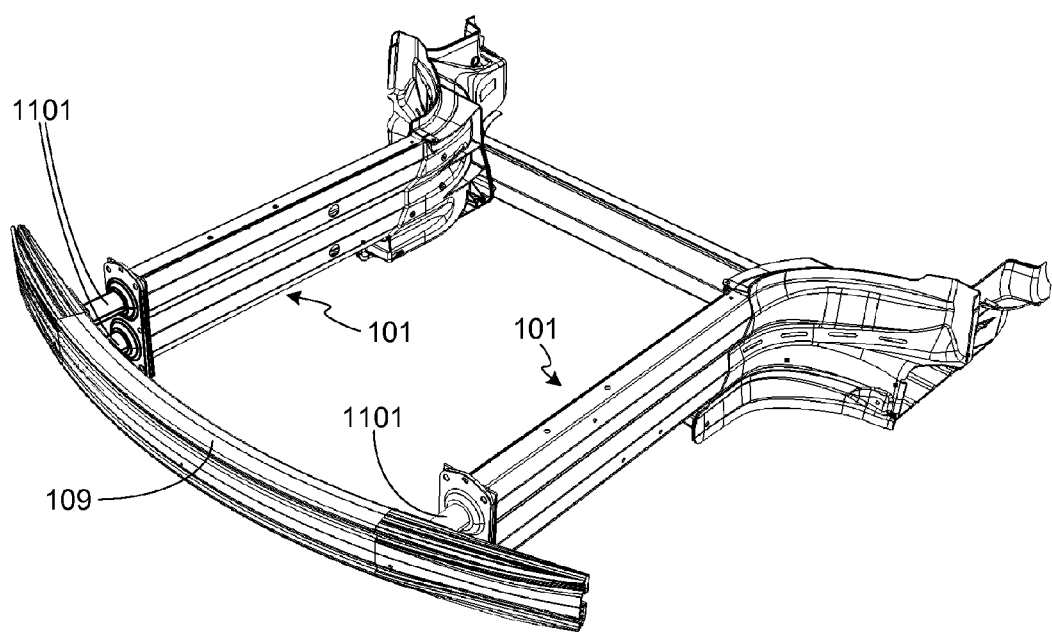
FIG. 11 provides a perspective view of an alternate embodiment utilizing two pairs of crash structures.

Although the inventor has found that typically a vehicle structure only requires a pair of crash structures, one attached to each side of the bumper as described and illustrated above, it should be understood that the crash structure of the invention may be used in other configurations without departing from the underlying concept. For example, in the embodiment illustrated in FIG. 11, integrated into each channel of each side rail 101 is a crash structure and actuator member 1101, thus providing increased energy absorption capabilities.

While the crash structure of the present invention has been shown relative to the front structure of a vehicle, it should be understood that the present invention is equally applicable to the rear vehicle structure, thereby enhancing passenger safety in collisions in which the rear of the vehicle is hit.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A bumper structure, comprising:
   a bumper;
   an actuator member coupled to said bumper; and
   a crash structure integrated within a vehicle side rail, wherein said vehicle side rail extends in a vehicle longitudinal direction, said crash structure comprising:
      a hollow housing separate from said vehicle side rail and configured to be inserted into said vehicle side rail, wherein a section of said actuator member passes into and is slidably disposed within said hollow housing; and
      a plurality of deformable members contained within a section of said hollow housing, wherein each of said plurality of deformable members is comprised of a hollow structure with an outer wall of each of said plurality of deformable members being common with said hollow housing, wherein said plurality of deformable members are separate from one another and do not share a common wall with adjacent deformable members, wherein a first portion of said actuator member is at least partially surrounded by said plurality of deformable members, wherein said first portion of said actuator member is of a first diameter, wherein a second portion of said actuator member is of a second diameter larger than said first diameter, wherein said second portion of said actuator member is closer to said bumper than said first portion of said actuator member, and wherein movement of said second portion of said actuator member into said hollow housing outwardly deforms said plurality of deformable members.

2. The bumper structure of claim 1, wherein said hollow housing and said plurality of deformable members are extruded.

3. The bumper structure of claim 2, wherein said hollow housing and said plurality of deformable members are comprised of aluminum or an aluminum alloy.

4. The bumper structure of claim 1, wherein said actuator member is comprised of a cylindrical tube.

5. The bumper structure of claim 4, wherein said cylindrical tube is fabricated from a material selected from the group of materials consisting of aluminum, aluminum alloys and steel.

6. The bumper structure of claim 1, wherein said second portion of said actuator member includes a chamfered transition region.

7. The bumper structure of claim 1, wherein said vehicle side rail is comprised of a pair of hexagon-shaped channels that share a common wall, and wherein said hollow housing comprising said crash structure is hexagon-shaped and configured to be inserted within one of said pair of hexagon-shaped channels comprising said vehicle side rail.

8. The bumper structure of claim 1, wherein said vehicle side rail is comprised of a pair of octagon-shaped channels that share a common wall, and wherein said hollow housing comprising said crash structure is octagon-shaped and configured to be inserted within one of said pair of octagon-shaped channels comprising said vehicle side rail.

9. The bumper structure of claim 1, wherein said hollow housing further comprises a first mounting flange, wherein said vehicle side rail further comprises a second mounting flange, and wherein said hollow housing is coupled to said vehicle side rail by attaching said first mounting flange to said second mounting flange.

10. The bumper structure of claim 9, further comprising a retention member coupled to said first mounting flange, wherein said retention member is held in place when said first mounting flange is attached to said second mounting flange, and wherein said retention member prevents said actuator member from being withdrawn from said hollow housing.

11. The bumper structure of claim 1, further comprising a retention member coupled to said hollow housing, wherein said retention member prevents said actuator member from being withdrawn from said hollow housing.

12. The bumper structure of claim 11, wherein said hollow housing further comprises a mounting flange, wherein said retention member is coupled to said mounting flange.

\* \* \* \* \*